US012767273B2

(12) United States Patent
Koynov

(10) Patent No.: US 12,767,273 B2
(45) Date of Patent: Oct. 20, 2026

(54) SNOWMOBILE TRANSMISSION

(71) Applicant: Sergey Vladimirovich Koynov, Saint-Petersburg (RU)

(72) Inventor: Sergey Vladimirovich Koynov, Saint-Petersburg (RU)

( * ) Notice: Subject to any disclaimer, the term of this patent is extended or adjusted under 35 U.S.C. 154(b) by 0 days.

(21) Appl. No.: 18/881,143

(22) PCT Filed: May 31, 2023

(86) PCT No.: PCT/RU2023/050131
§ 371 (c)(1),
(2) Date: Jan. 3, 2025

(87) PCT Pub. No.: WO2024/010493
PCT Pub. Date: Jan. 11, 2024

(65) Prior Publication Data

US 2026/0008517 A1 Jan. 8, 2026

(30) Foreign Application Priority Data

Jul. 7, 2022 (RU) .......................... RU2022118522

(51) Int. Cl.
*B62M 9/16* (2006.01)
*B62M 9/02* (2006.01)
(Continued)

(52) U.S. Cl.
CPC ................ *B62M 9/16* (2013.01); *B62M 9/02* (2013.01); *F16H 57/035* (2013.01);
(Continued)

(58) Field of Classification Search
CPC .... B62M 9/16; B62M 9/02; B62M 2009/007; F16H 2057/02056; F16H 57/035; F16H 63/302
See application file for complete search history.

(56) References Cited

U.S. PATENT DOCUMENTS 11,220,310 B2 * 1/2022 Pard ....................... B62M 11/06
2004/0092351 A1 * 5/2004 Bergman ............. F16H 7/0838 474/140

(Continued)

FOREIGN PATENT DOCUMENTS

CA 2935113 A1 7/2015
RU 161842 U1 5/2016

(Continued)

OTHER PUBLICATIONS

Translation of Written Opinion of the International Searching Authority issued in PCT/RU2023/050131 on Oct. 5, 2023.

*Primary Examiner* — Minh Truong
*Assistant Examiner* — Mark K Buse
(74) *Attorney, Agent, or Firm* — Hoffmann & Baron, LLP

(57) ABSTRACT

Snowmobile transmission, including a housing with a cover, an input shaft and an output shaft arranged inside the housing, and a chain transmission drive including a chain connecting a drive sprocket arranged on the input shaft to a driven sprocket arranged on the output shaft, a reverse gear axle about which a reverse gear sprocket freely rotates also arranged inside the housing, the reverse gear sprocket engaging with the chain, and a reverse gear engaging with a movable gear arranged on a spline coupler of the input shaft, which is movable by tilting an inner switching fork and being driven by an axle with a lever, an adjusting rod, an outer switching fork, wherein rotation of the outer switching fork is restricted by a removable sector attached to the housing cover, and an adjusting screw arranged on the housing, abutting against a support sleeve and fixed by a cotter pin.

6 Claims, 10 Drawing Sheets

(51) Int. Cl.

| | |
|---|---|
| ***F16H 57/035*** | (2012.01) |
| ***F16H 63/30*** | (2006.01) |
| *B62M 9/00* | (2006.01) |
| *F16H 57/02* | (2012.01) |

(52) U.S. Cl.
CPC ..... *F16H 63/302* (2013.01); *B62M 2009/007* (2013.01); *F16H 2057/02056* (2013.01)

(56) References Cited

U.S. PATENT DOCUMENTS

| | | | | |
|---|---|---|---|---|
| 2014/0162820 | A1* | 6/2014 | Kato | F16C 33/62 474/140 |
| 2018/0154985 | A1* | 6/2018 | Thompson | B62D 55/07 |
| 2020/0408292 | A1* | 12/2020 | Pard | F16H 61/0246 |

FOREIGN PATENT DOCUMENTS

| | | | |
|---|---|---|---|
| RU | 2628554 | C1 | 8/2017 |
| RU | 188662 | U1 | 4/2019 |

* cited by examiner

SNOWMOBILE TRANSMISSION

CROSS-REFERENCE TO RELATED APPLICATIONS

The present application is the U.S. National Phase of PCT/RU2023/050131, filed on 31 May 2023, which claims priority to Russian Patent Application No. 2022118522, filed on 7 Jul. 2022, the entire contents of which are incorporated herein by reference.

BACKGROUND

Technical Field

The claimed technical solution relates to the structures of vehicle transmissions and gearboxes, namely to the structures of snowmobile transmissions.

Prior Art

Numerous snowmobile transmission structures are known, which are analogues of the claimed technical solution.

A snowmobile structure is known, which is described in patent CA2935113A1, IPC B62M 27/02. Snowmobile chassis includes a casing for receiving gears and a chain, which drive a track. A tensioner with a slider is arranged in a transmission housing, which is fixed within the latter by means of two ribs. The tensioner moves linearly by screwing and unscrewing the adjusting screw arranged in the housing at its front side. The tensioner and the support element in the cover are made in the form of a single part. The adjusting screw is fixed with a nut, as such it has a relatively short thread length within the housing.

The main drawback of the known design consists in its poor maintainability due to the use of a tensioner which is integral with a guide along which the chain moves, which leads to its short life. Also, the adjusting screw with a relatively short threaded support portion is used in this structure, which inevitably makes the adjusting screw diverge from the centerline of the opening, causes the formation of an irregular contact pattern between the screw and the tensioner, and, consequently, to uneven adjustment.

A snowmobile structure is also known, which is described in Russian invention U.S. Pat. No. 2,517,918, published 10 Jun. 2014, IPC B62M 27/02, B62K 19/00, B62K 19/22, F01M 11/00, B62M 29/00. The drive train in this structure is supported by a frame and consists of an engine and a variator. At the same time, the drive train system includes a drive shaft which carries one or more track drive primary gears, which engage with the caterpillar track; the primary gears transmitting power onto the caterpillar track. In the operating position, the variator is connected to the upper drive shaft. The upper drive shaft is connected to the lower drive shaft via a chain transmission. The drive shaft includes a slot section. The slot section extends through an opening in the chain drive housing and an opening in the chain drive cover. The upper drive shaft has one bearing and a one seal in the housing and the same in the chain transmission cover. The first gear is arranged between two bearings in the slot section of the upper drive shaft. A brake disc is also arranged at the slot section. Besides, the chain transmission housing includes various installation points for building various configurations of vehicles. The inner part of the housing also includes means for directing an oil flow to the second gear.

Judging by the images published together with the description of the patent, a tensioner with a slider is arranged within the chain transmission housing, which is fixed in the latter by means of two ribs. The tensioner moves linearly by screwing and unscrewing a bolt arranged in the housing at its front side. As such, the tensioner and the support member in the cover are made in the form of a single part. The adjusting screw is fixed with a nut, as such it has a relatively short thread length within the housing.

The main drawbacks of the known structure are: poor maintainability due to the use of an integral tensioner that has a guide along which the chain moves, which leads to its short life. Also, the adjusting screw with a relatively short threaded support portion is used in this structure, which inevitably makes the adjusting screw diverge from the centerline of the opening, causes the formation of an irregular contact pattern between the adjusting screw and the tensioner, and, consequently, to uneven adjustment.

A structure of a gearbox with a reverser device for a snowmobile is also known, which is described in Russian utility model U.S. Pat. No. 155,672, published 20 Oct. 2015, IPC F16H 7/08, B62M 27/02. The gearbox comprises a housing, drive shaft with a sprocket, a reverse shaft with a sprocket engaged therewith, and an output shaft with a sprocket, all being parallel. The sprockets of the reverse shaft and the output shaft have a fixed connection to their shafts. All three of the above-described sprockets are engaged by a chain which is provided with a tensioner mechanism. The tensioner mechanism includes a tensioner shaft, a tensioner sprocket which is engaged with the chain. The tensioner shaft is arranged parallel to the other shafts in the gearbox. The tensioner sprocket is mounted on the tensioner rotatably relative thereto and has an eccentricity relative to its axis. The tension is adjusted within said eccentricity. The tensioner sprocket may be provided with a hub.

The main specificities of this prior art gearbox structure are: the arrangement and installation direction of the gearbox shafts, use of a multi-row (bushing/roller) chain, tension adjustment within the eccentricity, use of the reverse shaft, and use of the tensioner sprocket.

The prior art structure has the following drawbacks: limited amount of eccentricity that enables the adjustment of chain tension, complicated chain tensioner structure due to the use of the tensioner sprocket, and increased chain wear due to the inclusion of additional contacting teeth of the tensioner sprocket.

A gearbox structure is also known, which is described in Russian utility model U.S. Pat. No. 159,766, published on 20 Feb. 2016, IPC F16H 7/08, B62M 9/16, B62M 11/00. This prior art structure differs from the structure of the gearbox according to patent No. 155672 in that the tensioner shaft is installed non-parallel to other shafts of the gearbox.

Furthermore, main drawbacks of this structure are: limited amount of eccentricity that enables the adjustment of the chain tension, complicated chain tensioner structure due to the use of a tensioner sprocket, and increased chain wear due to the inclusion of additional contacting teeth of the tensioner sprocket.

A gearbox structure is also known, which is described in Russian utility model U.S. Pat. No. 161,842, published 10 May 2016, IPC F16H 7/06, B62M 9/06. This structure differs from the one according to patent No. 155672 in that it uses a cluster gear intended to increase the number of gear ratios used in the gearbox.

Main drawbacks of the prior art structure are: limited amount of eccentricity that enables the adjustment of chain tension, complicated chain tensioner structure due to the use of a tensioner sprocket, and increased chain wear due to the inclusion of additional contacting teeth of the tensioner sprocket, as well as increased gearbox weight due to the use of the additional cluster gear.

A chain tensioner structure is also known, which is described in patent US20040092351A1, IPC F16H 7/08, F16H 7/12. The prior art structure comprises a chain and sprocket mechanism which comprises a first sprocket, a second sprocket, and a chain engaged with the first and second sprockets, such that rotation of the first sprocket moves the second sprocket through the chain. The chain tensioner engages with the chain between the first and second sprockets so as to provide tension to the chain. The chain tensioner is at least partially made of an elastic material such as rubber or flexible plastic. The flexible material dampens the tensioner and prevents vibration transmission. Tensioner position may be adjusted by linearly moving the former.

Main drawbacks of this prior art chain tensioner structure are that the chain tensioner is made as an integral part together with a tensioner support and is made of a material which is elastic, but not strong enough. This causes low wear resistance of the chain tensioner.

A vehicle transmission structure is also known, which is described in patent CA2988017A1, IPC B62D 55/07, B62D 55/08, B62D 55/12. The patent discloses a structure of a snowmobile, which includes an engine mounted on a chassis, a drive track in contact with the chassis, and a drive gear operatively coupling the engine to the drive track to provide propulsion force to the drive track. The drive train includes a driveshaft, comprising a tubular driveshaft which includes two or more interior channels, the channels being positioned in a substantially longitudinal orientation, two or more sprocket driving features on the exterior surface of the tubular driveshaft, and one or more fitting components, positioned at one or more distal ends of the driveshaft. This structure uses chain guides (sliders) made of heat-resistant, wear-resistant plastic. In this case, the sliders work only for reverse gear, wherein the chain tensioner has either automatic or mechanical tension adjustment, wherein the adjusting screw is arranged in the front part of the housing.

Main drawback of this prior art structure is that the sliders work only when reverse gear is switched on, wherein additional sprockets and an additional chain are used for reverse gear. Such structure does not contribute to reducing vibrations of the forward chain and does not provide for chain support in case its tension is loosened while forward gear is selected, which may lead to instability in the transmission of torque from the leading sprocket to the chain and from the chain to the driven sprocket. This also reduces the reliability of the structure, and increases its weight and reduces the service life of the transmission unit.

Structure of a vehicle gearbox described in patent US20200408292A1, IPC B62M 11/06; B62M 27/02; B62M 9/04; F16H 37/02; F16H 37/06; F16H 57/02; F16H 59/04 was selected as a prototype, the structure including a housing which consists of several parts; input and output shafts; upshift sprockets and downshift gears mounted on the first transmission shaft; upshift gears and downshift sprockets mounted on the second transmission shaft. The upshift and downshift gears are in constant engagement therebetween so as to operate at different gears. The drive gear is attached to the input shaft, which is mounted in the housing. The input shaft of the gearbox is coupled to an engine crankshaft by means of a variator. Driven gear is arranged on the first shaft. A drive sprocket is arranged on the second shaft, the driven sprocket is arranged on the output shaft. A drive chain connects the second shaft to the output shaft. A chain tensioner has a drive member made of plastic in the shape of a circle sector with a large radius and an adjusting screw. Gear shifting is performed by moving the locking ring for forward drive, and gear shifting between reverse and forward drive is performed by moving the second locking ring.

As such, the prototype has the following drawbacks:

1. The prior art snowmobile transmission structure has an excessively large axle spacing between the input and output shafts, which is known from examples of snowmobiles manufactured in accordance with this patent, such as BRP Expedition Sport 900 ACE model 2019-2022 (see publication https://universalmotors.ru/snowmobiles/brp/brp-snowmobile-expedition-sport-900-ace/). Publicly available references, such as a manufacturer's spare parts catalog, also specify that this snowmobile model uses a chain with the number of links being 116. When evaluating the axle spacing for this model and assuming that the layout and components used are identical to the claimed technical solution, the axle spacing in the prototype is approximately 367.1 mm. As such, a large axle spacing increases the length of the chain and the amplitude of its oscillations, which reduces the reliability of the chain engagement with the sprockets;
2. The prior art transmission structure uses a tensioner that is equipped with a high-strength plastic chain guide. This is also a drawback, since only sliding friction occurs between the chain guide and the chain, which increases the wear of the latter as compared to rolling friction. Sliding friction requires that the chain guide should be made of durable and wear-resistant plastic, which increases the cost of the product;
3. In the prior art structure, there is no second support point for the tensioner in the transmission housing cover, and the sliding surfaces of the chain tensioner support are located within the housing, which may cause the tensioner to depart from the plane that is perpendicular to the mating face of the transmission. This causes the formation of an irregular contact pattern between the chain guide and the chain, and, as a result, to uneven wear of the latter. As such, the load on the chain tensioner is also applied to an opposite edge as regards an abutment point on the housing. This can cause an angular displacement or deformation of the chain tensioner, which also leads to its uneven wear, reduced service life and reliability of the entire transmission structure;
4. In the prior art transmission structure, the adjusting screw rests inside the housing against a blind milled opening. This is also a drawback, since the adjusting screw transfers the load it receives from the chain tensioner to the cylindrical face of the support opening in the housing, which causes deformation of this opening and reduces the service life and reliability of the entire structure;
5. The prior art structure does not provide for the installation of repair parts, e.g. a repair support screw used in case of wear of the support sleeve of the adjusting screw. This also reduces the maintainability of the entire product;
6. In the prior art structure, spring pins are used in the inner switching forks. As such, spring pins have a shorter life as compared, for example, with a solid hardened pin, since they are made of sheet steel, which causes eyelet cracking in the course of maintenance operations for replacing the pins, and also causes the inner fork to disintegrate in the region of the central part of the wall under extreme operating conditions. It also does not provide for sufficient reliability, service life and maintainability of the entire transmission structure.

Thus, the main drawbacks of all prior art structures, including the prototype, include:

increased axle spacing between the input and output shafts, which leads to excessive oscillations of the long chain, as well as to an insufficient number of simultaneous chain engagements with reverse gear sprocket teeth (maximum 3-4 teeth), which reduces the reliability of the structure;

unreliable chain tensioner attachment due to the absence of a second abutment point in the cover of the chain transmission housing;

a blind opening in the housing of the chain transmission for the adjusting screw without a support sleeve, which leads to intense wear and short service life of this assembly;

instability and unreliability of chain engagement with the reverse sprocket and driving sprocket teeth in case of low chain tension and its excessive oscillations due to the lack of additional chain guides;

insufficient thickness of the spring pins in the reverse drive fork, as well as the use of an inner shift fork that does not have sufficient wall thickness, which leads to a shorter service life and lower reliability of the transmission structure;

use of a guide chain that only receives sliding friction, which causes its increased wear.

SUMMARY OF THE INVENTION

Technical Objective

The technical problem to be solved by means of the claimed invention consists in insufficient reliability and service life of prior art snowmobile transmission structures, as well as their low maintainability.

The technical result achieved by means of the claimed invention consists in enhanced reliability, service life and maintainability of the snowmobile transmission.

Solution to the Problem

The above-mentioned technical result is achieved by means of a structure of a snowmobile transmission, which comprises a chain transmission housing with a cover, an input and output shaft arranged inside the housing, as well as a chain transmission drive, the chain transmission drive including a chain that connects the drive sprocket arranged on the input shaft to the driven sprocket arranged on the output shaft, a reverse gear axle about which the reverse gear sprocket freely rotates being also arranged inside the housing, the reverse gear sprocket engaging with the chain, and a reverse gear which engages with a movable gear arranged on a spline coupler of the input shaft, which is movable by virtue of tilting an inner switching fork and being driven by means of an axle with a lever, an adjusting rod, an outer switching fork, rotation of which is restricted by means of a removable sector, which is intended to restrict the range of movement of the outer switching fork, and which is attached to the housing cover, and an adjusting screw being further arranged on the housing, the screw abutting against a support sleeve and being fixed by means of a cotter pin, as well as a chain tensioner, on which a chain tensioner support is arranged, the support abutting against the housing cover, wherein a steel roller is also arranged on the chain tensioner, chain guides (sliders) being also arranged inside the housing, the axle spacing between the input and output shafts being made as small as possible and being within the range of 291.1 to 291.2 mm.

A marking opening may be further provided in the chain transmission housing, which is intended to allow for the arrangement of a repair support screw with a sealing ring.

In the claimed structure, wall thickness of the outer and inner forks may be further increased within the following ranges: 4.9 to 5.1 mm for the inner fork and 7.85 to 8 mm for the outer fork.

Cylindrical hardened solid pins may also be used to ensure reliable contact with the inner switching fork.

Thus, the claimed structure has the following specificities and differences as compared to the prior art analogues and prototype:

Said range of axle spacing between the input and output shafts of 291.1 to 291.2 mm is stipulated by the fact that there is a requirement for axle spacing between the driven and driving sprockets according to the ANSI B29.2M-1982 standard, which should be within the range of 30 to 50 times the drive chain pitch value. For high-load transmission chains with variable load values, it is not recommended to exceed this range. This leads to a decrease in the number of chain links and a decrease in the length of the chain, which results in the smallest chain sagging, the latter being adjusted using the chain tensioner, wherein the smallest bend of the chain portion in the area of the tensioner is ensured. As such, minimum allowable sprocket axle spacing is a parameter at which service life of the sprockets and the chain will be optimal or close to the maximum value.

The value of the minimum allowable spacing is specified, in particular, in the guidelines of various manufacturers of chain transmissions, such as Tsubakimoto (The Netherlands), CROSS+MORSE (Great Britain), Sitspa (Italy), Renold (Germany). Experiments, modeled samples and prototypes with axle spacing values of 340, 308.38 and 291.16 mm showed that axle spacing of 291.16 mm is the most acceptable in terms of engagement reliability for a chain transmission with this arrangement of components.

Thus, feasible axle spacing between the input and output transmission shaft axles is within the range of 291.1 to 291.2 mm, while the optimal axle spacing is 291.16 mm, which is the closest to the minimum feasible. In this case, the smallest number of teeth of the reverse gear sprocket, which are continuously engaged with the chain—4 to 6—is also achieved.

So, e.g., given the following conditions:

tensioner roller diameter: 40 mm;
number of output shaft teeth: 49;
number of input shaft teeth: 24;
number of link sections: 100,
at least 4 teeth of the reverse gear sprocket will be in continuous engagement.

In general, there are 5 teeth.

Given the following conditions:

tensioner roller diameter: 40 or 44 mm;
number of output shaft teeth: 51;
number of input shaft teeth: 21;
number of link sections: 100,
5 to 6 teeth of the reverse gear sprocket will be in continuous engagement with the chain.

Other combinations of numbers of sprocket teeth for the output and input shafts are also possible, e.g. 53/24, 51/24, 49/21, 45/24, 45/21. In these cases, the number of continuously engaged teeth of the reverse gear sprocket in the range of 4 to 6 will also be reached, which prevents the chain from falling off the teeth of the reverse gear sprocket in case of an abrupt change in the transmitted torque value.

By virtue of this, oscillations and the moment of inertia of the chain are reduced, which increases the reliability and service life of the entire transmission.

2. In the claimed structure, a removable part—the sector—is used, which is designed to restrict the length of movement of the outer gear switching fork. As such, the sector is arranged on a special pad on top of the housing cover and fixed with screws to the eyelets of the cover. A sleeve is installed inside the sector, which ensures the rotation of the axial screw together with the outer switching fork. Use of the sector in the form of a removable part increases the service life and maintainability of the structure.

3. In the claimed structure, a chain tensioner is used with a steel roller mounted on it, which rotates about a bearing (for example, about a needle bearing). This ensures that the chain tensioner roller runs along the reverse surface of the chain (rather than sliding friction along the guide chain, as is the case with the prototype), which increases the service life, reliability and maintainability of the chain tensioner system.

As such, an opening may also be provided on the outer cylindrical surface of the roller, which leads to an inner groove of the roller and then to another opening on the outer bearing cage. These openings allow for lubrication of the roller bearing. Besides, special openings in support and thrust washers provide for the circulation of lubricant inside the bearing, which also increases the service life and reliability of the entire structure.

4. In the claimed structure, a tensioner support is mounted on the chain tensioner, which abuts against the housing cover. By virtue of this, there is another point for chain tensioner support in the transmission. This also increases the service life and reliability of the chain transmission drive structure.

5. Additional guides (sliders) for the chain are installed in recesses inside the housing, which function both when forward gear and when reverse gear are selected. By virtue of using the additional guides, stability of the chain engagement with the sprockets is increased.

6. In the prototype structure, the adjusting screw rests in a blind milled opening within the chain transmission housing, whereas in the claimed technical solution, the adjusting screw of the chain tensioner abuts against a support sleeve, which is a replaceable part.

7. A seat may be further provided on the housing for installing a removable support sleeve configured for the adjusting screw to abut against it. In this case, the support sleeve is mounted in a blind opening in the housing. By virtue of this, the adjusting screw does not wear out or damage the housing with its front part, since it only contacts the support sleeve. This increases the maintainability and reliability of the structure.

8. A marking opening may be further provided in the chain transmission housing, which is intended for drilling and thread cutting so as to accommodate a service support screw with a blind support opening and with a sealing ring instead of the support sleeve for the adjusting screw of the chain tensioner.

This is provided for the case where the support sleeve for the adjusting screw and the position for the former in the housing are worn out. This increases the maintainability of the chain transmission housing.

9. Besides, wall thickness of the outer and inner forks may be increased within the following ranges: 4.9 to 5.1 mm for the inner fork; 7.85 mm to 8 mm for the outer fork. Experimental data from the tests of five samples with smaller thicknesses showed that the theoretical strength limits departed from the actual ones.

Besides, cylindrical hardened one-piece pins may be further used to contact the inner switching fork.

All this leads to an increase in the service life, reliability of the connection and maintainability of this assembly.

Advantageous Effects of the Invention

Thus, by virtue of the claimed structure, the following drawbacks of analogues and the prototype are eliminated:

1. By setting the axle spacing between the input and output shafts to be the closest to the minimum allowable one and in the range of 291.1 to 291.2 mm, oscillations and the moment of inertia of the chain are significantly reduced, thereby increasing the reliability and service life of the entire transmission.

2. By providing a sector on the housing cover, which is configured to restrict the range of movement of the outer gear switching fork, the service life and maintainability of the entire structure is increased.

3. By using a chain tensioner with a rotating steel roller mounted on a bearing, the service life, reliability and maintainability of the chain tensioning system is increased.

4. By virtue of a tensioner support being arranged on the tensioner and abutting against the housing cover, a second support point for the chain tensioner is provided in the transmission. This also increases the service life and reliability of the chain tensioning system structure and the transmission as a whole.

5. Due to the installation of additional guides (sliders) inside the housing, stability of engagement between the chain and the sprockets is increased.

6. In the structure of the prototype, the adjusting screw abuts against a blind milled opening inside the chain transmission housing, while in the claimed technical solution, the adjusting screw of the chain tensioner abuts against the support sleeve.

7. Due to the possibility of providing a service support screw with a sealing ring in the chain transmission housing, in case the support sleeve of the adjusting screw is worn out, maintainability of the chain transmission housing is increased.

8. By increasing the wall thickness of the inner and outer switching forks within the range of 4.9 to 5 mm for the inner fork and of 7.85 to 8 mm for the outer fork, as well as by using cylindrical hardened solid pins in the inner switching fork, the service life, connection reliability and maintainability of this assembly are significantly increased.

BRIEF DESCRIPTION OF THE DRAWINGS

The claimed structure is explained using the following drawings:

FIG. 1 General view of the transmission;

DETAILED DESCRIPTION

Figure 1:
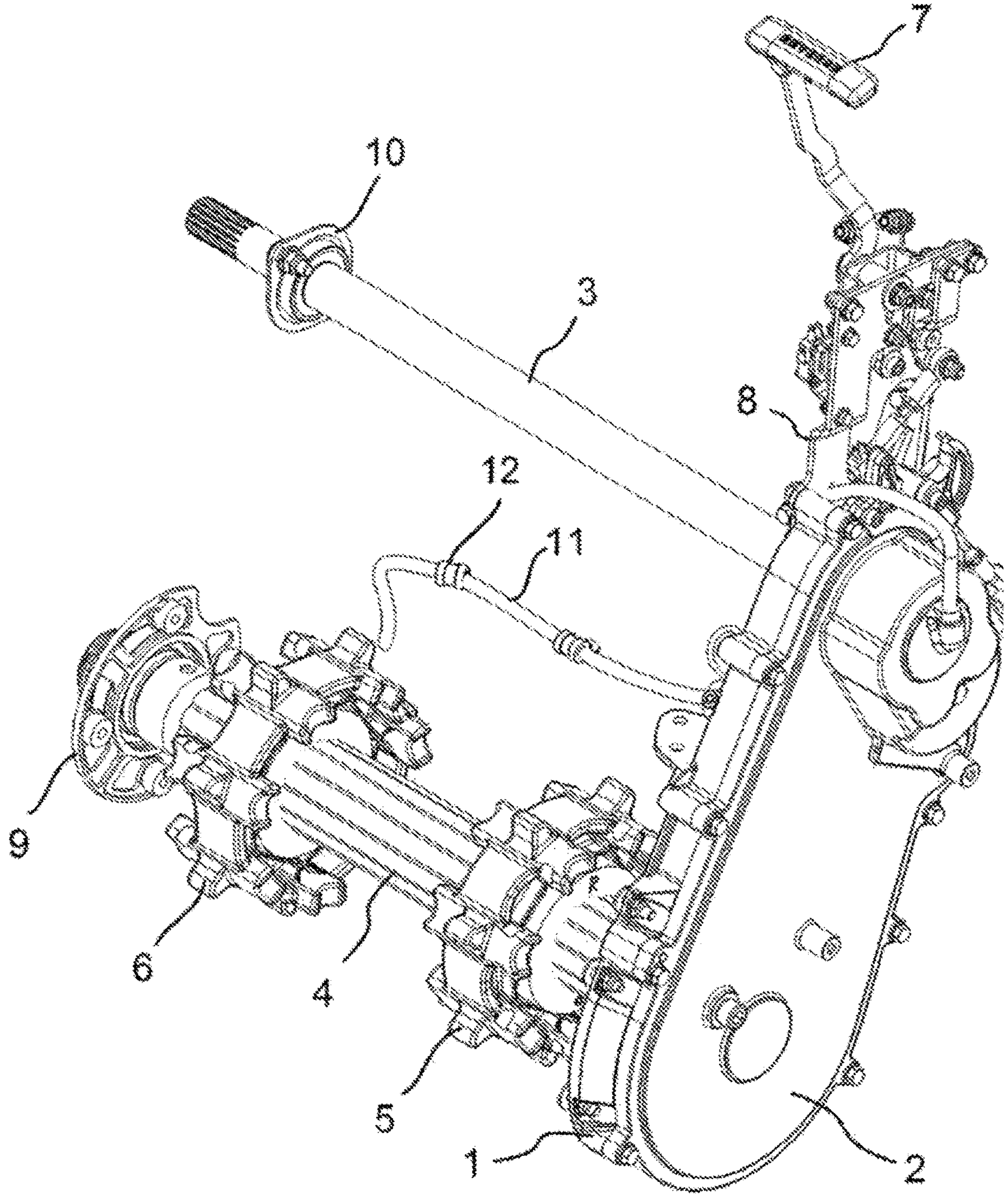
FIG. 1

The snowmobile transmission includes a chain transmission housing 1 having a chain transmission housing cover 2, as well as an input shaft 3 and an output shaft 4 arranged within the housing 1, a spline coupler 47 with a drive sprocket 42 is arranged on the input shaft 3 via a spline coupling, and a driven sprocket 41 is arranged on the output shaft 4 via a spline coupling, wherein the sprockets 41 and 42 are connected by means of a chain 38.

The input shaft 3 is arranged inside the housing by means of a bearing 24, and the sealing of the housing 1 at the opening for the input shaft 3 is provided by means of a lip sealing 34. The output shaft 4 is arranged inside the housing 1 by means of a bearing 25, and the housing is sealed by a lip sealing 35. The bearings 24 and 25 are arranged in recesses of the housing 1 and fixed therein by means of locking rings 28 and 29, respectively.

Besides, the driven sprocket is fixed to the driven shaft by a locking ring 46. Inside the housing, the spline coupler 47 is provided, which is arranged on the spline coupling of the input shaft 3. As such, the drive sprocket 42 is arranged on a cylindrical surface by means of a needle bearing from the inside of the spline coupler 47 and is fixed by means of a locking ring. The spline coupler 47 is fixed on the input shaft 3 by means of a bolt 56. Besides, the rear 18 and front 20 chain guides are fixed by means of cotter pins inside the housing 1 using brackets 19 and 21, respectively, by means of screws. Besides, an adjusting screw 17 is provided in the through opening of the housing 1 and in the shaped cutout, which abuts in the front part against the support sleeve 36. A tensioner assembly 57 is arranged in the shaped recess of the housing 1 and on the adjusting screw 17. A sealing ring 52 for the housing 1 is arranged in a groove on the adjusting screw. A locking cotter pin 27 is arranged in one of the openings of the adjusting screw 17 and in the corresponding cutout of the housing 1 on the left side. As such, the tensioner assembly 57 consists of a tensioner 14, a sliding support washer 49, a tensioner roller 16, a roller bearing 54, a locking ring 53, a locking ring 55, a thrust washer 50, a tensioner support 15, and a countersunk screw 51.

Besides, a reverse gear axle 22 is arranged inside the housing 1, on which a thrust sleeve 23 is mounted and a reverse gear sprocket 43 is rotated by means of a needle bearing, also interacting with the chain 38, and a reverse gear 40, which interacts with a movable gear 39 arranged on a spline coupler 47 of the input shaft 3.

A spacing washer 76 is arranged on the reverse gear axle 22 at the right end of the reverse gear.

Besides, two pins 30 are arranged in the housing 1, along the axis of which the housing cover 2 is docked onto the housing 1. As such, the housing cover 2 also covers the tensioner support 15 with its shaped recess. Besides, the housing cover 2 is mounted on the reverse gear axle 22, and the housing cover 2 contacts the spacing washer 76 with its inner protrusion. A sealing cord 37 is arranged in the groove of the housing 1 between the latter and the housing cover 2.

The inner switching fork 68 is arranged inside a recess in the housing cover 2, the former being fixed by spring pins 70 on the axle of the lever 64, wherein the lever with the axle 64 is, in its turn, inserted into a through and blind opening in the housing cover 2. Copper spacing rings 71 are arranged between the housing cover 2 and the inner switching fork 68. As such, cylindrical hardened one-piece pins 69 are arranged in both eyelets of the inner switching fork. On the outside, the switching sector 59 is arranged on top of the housing cover 2, which is fixed in the eyelets of the housing cover 2 by means of two screws 65. An outer switching fork 61 is arranged in the cutout of the sector 59, the former being fixed with an axial screw 60. In the housing cover 2, an outer switching fork 61 and a lever with an axle 64 are coupled to each other using a standard adjusting rod 63 by means of screws 66 and 65.

In the upper part of the housing cover 2, a filling opening cap 58 with a transmission ventilation hose inserted into it is arranged. Besides, a check plug 67 with a sealing washer is arranged in the lower part of the housing cover 2. A reverse limit switch 62 is arranged on the switching sector by means of screws 72 and nuts 73.

The housing cover 2 is fixed to the housing 1 by means of ten units of bolts.

On the right side of the housing 1, gear shift lever mechanism support bracket with the gearshift lever 8 and the lever 7 with its drive mechanism assembly on the bracket are fixed to the two eyelets by means of bolts.

The hose 11 is fixed to the snowmobile using three brackets 12.

Figure 2:
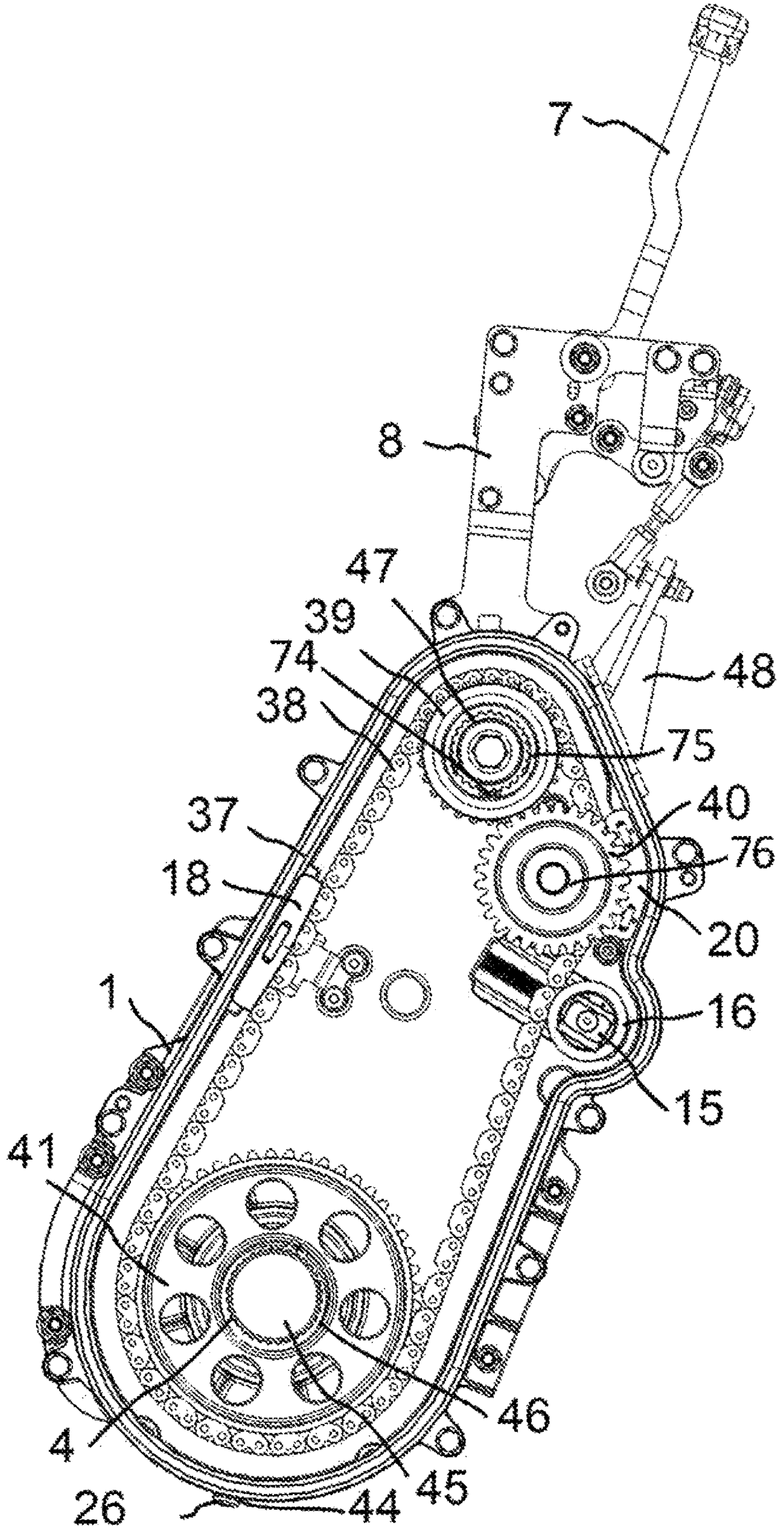
FIG. 2 Right-side view of the assembled transmission without the chain transmission housing cover.
Figure 3:
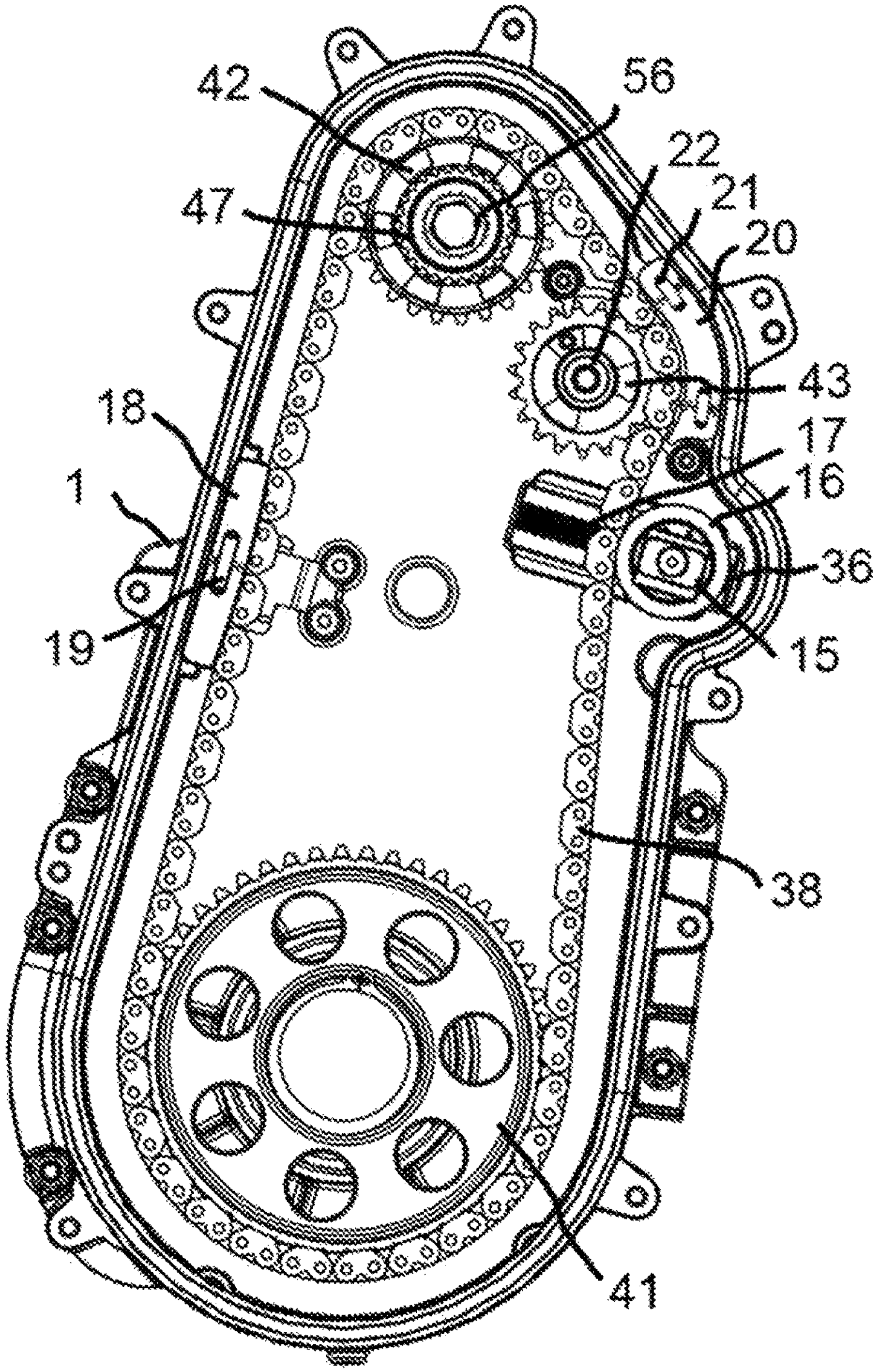
FIG. 3 Right-side view of the assembled chain transmission housing without its cover.
Figure 4:
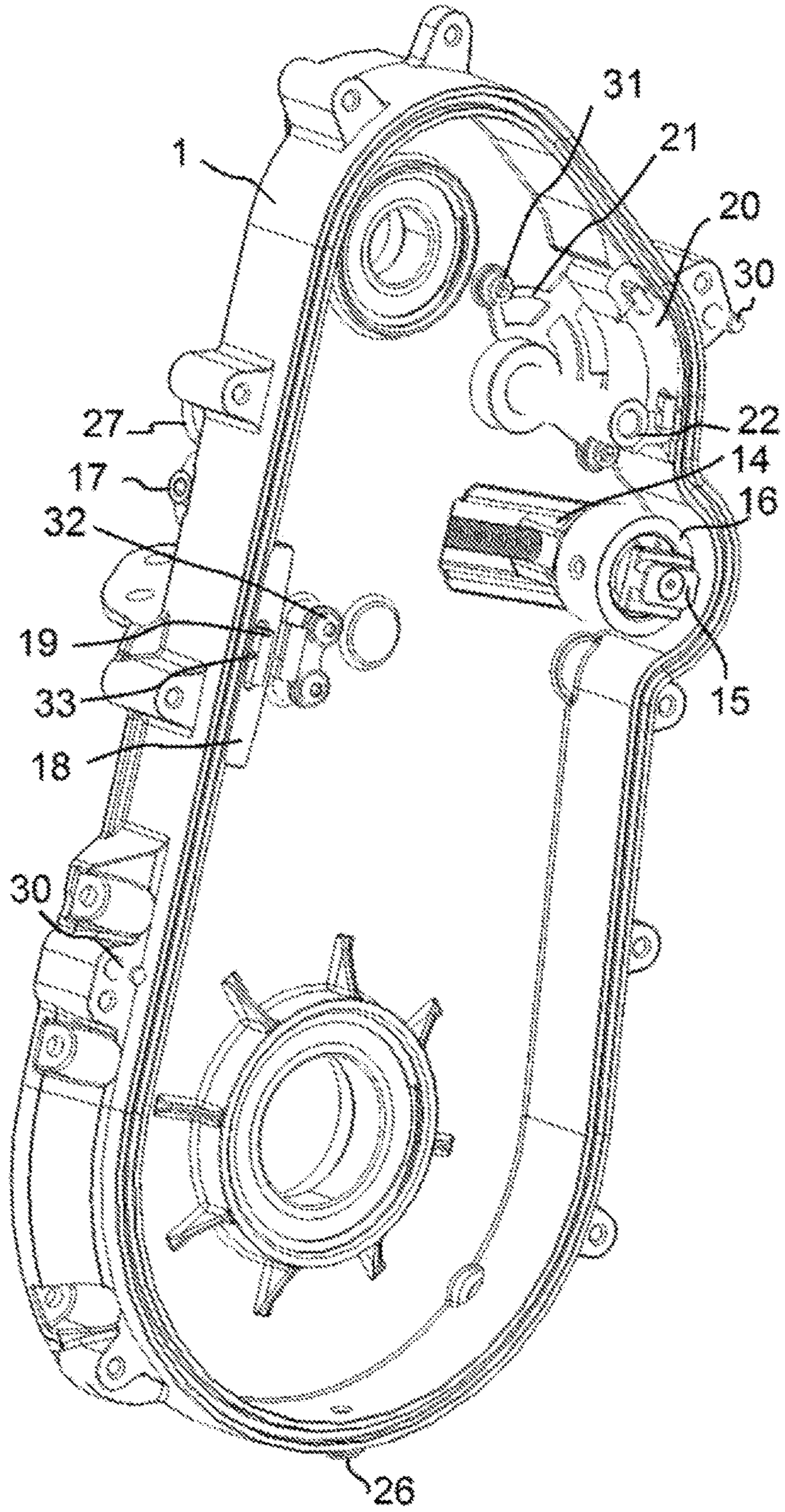
FIG. 4 Assembled chain transmission housing.

When the gearshift lever 7 is moved from the front position in (FIG. 2) to the rear position until it stops (in FIG. 1), the effect is transmitted from the lever 7 to the outer switching fork 61 by means of drive rods and levers of the gearshift lever 7 mechanism, part of which are fixed to the support bracket 8 and have a specific kinematic scheme for transmission of the effect. The outer switching fork 61 rotates within the sector 59 and is fixed in the second extreme position after passing the intermediate apex of its trajectory, which allows a short reverse movement of the inner fork 68 to fix it and restrict the compression motion of a pullback spring, which is arranged in the recess of the movable gear 39. When the fork 61 turns, the standard adjusting rod 63 attached to it moves, wherein the lever connected to it rotates with the axle 64. By turning the lever with the axle 64, the inner switching fork 68 also turns due to its fixation on the axle 64 by means of spring pins 70. The fork 68 moves the movable reverse gear 39 to the right along the spline coupling on the spline coupler 47 by means of two cylindrical hardened one-piece pins 69. At this time, the spike-groove elements of the movable gear 39 and the drive sprocket 42 disengage. The drive sprocket 42 continues to rotate freely about the spline coupler 47 by means of a needle bearing and be engaged with the chain 38, and the movable gear 39 enters into a gear engagement with the reverse gear 40. The gear 40 is engaged with the reverse gear sprocket 43 by means of the spike-groove elements. The reverse gear sprocket 43 is in continuous engagement with the drive chain 38. The torque from the input shaft 3 is transmitted to the spline coupler 47, then to the movable gear 39, then to the reverse gear 40, then to the reverse gear sprocket 43, then to the drive chain 38, then to the driven sprocket 41 and, by means of the spline coupling, to the output shaft 4, then to the left 6 and right 5 track drive sprockets by means of a mounting seat which has a profiled outline. When the gearshift lever 7 is again moved forward until it stops upon the sector 59 by means of the outer fork 61, the operations take place in a reverse sequence, and the front gear is switched on.

A chain tensioner 14 is arranged in the housing 1, the former being provided with a tensioner adjusting screw 17, wherein a steel tensioner roller 16 and a steel tensioner support 15, which abuts against the housing cover 2, are arranged on the chain tensioner 14 on a bearing 54.

Guides 18 and 20 are also arranged on the chain transmission housing 1, which are intended for supporting the chain 38.

The claimed structure operates as follows:

In snowmobile transmission, torque is transmitted from the input shaft 3 to the output shaft 4, and its amount is transformed depending on the gear ratio used to propel the snowmobile, or the direction of rotation of the output shaft 4 is changed depending on the selected forward or reverse gear so as to change the travel direction of the snowmobile. By means of axle spacing between the input shaft 3 and output shaft 4, which is in the range of 291.1 to 291.2 mm, a drive chain 38 is used that has a smaller number of links and a shorter length, which significantly reduces the oscillations and moment of inertia of the chain, thereby increasing the reliability and extending the service life of the entire transmission.

The tensioning system of the drive chain 38 provides for precise adjustment of the position of the chain tensioner 14 with a steel roller 16 arranged thereon. By using a rotating steel roller 16 on a bearing, the rolling of the roller 16 of the chain tensioner 14 along the reverse surface of the chain 38 is ensured (and not only sliding friction, as in the closest prior art), which extends the service life, improves the reliability and maintainability of the chain tensioner system.

An opening is provided in the outer cylindrical surface of the roller 16, which leads to the inner groove of the roller 16 and further to an opening in the outer cage of the bearing 54. These openings enable the lubrication of the bearing 54 of the roller 16. Besides, special openings in the support washer 49 and thrust washer 50 provide for the circulation of lubricant inside the bearing. This also increases the service life and reliability of the entire structure.

By virtue of said axle spacing, the described chain tensioning system and its arrangement, sagging of the chain 38 is prevented, which contributes to increased angular coverage of the drive sprocket 42, the driven sprocket 41 and the reverse gear sprocket 43 by the chain. This ensures reliable contact between the teeth of the sprockets 41, 42 and 43 and the chain 38 and increases the number of teeth simultaneously engaged with the chain 38. Also, by virtue of this, amplitude of oscillations of individual sections of the chain is reduced. This increases the reliability of the entire structure.

The chain tensioner 14 moves within the recess of the chain transmission housing 1 along the adjusting screw 17 by virtue of its rotation. The chain tensioner 14 is arranged such that the beveled part of its axle is directed upwards within the housing 1. Clockwise rotation of the adjusting screw 17 causes the tensioner to move backwards, and the tension of the drive chain 38 is increased. Counterclockwise rotation of the adjusting screw 17 causes the tensioner 14 to move forward, and the chain tension is reduced. The adjusting screw 17 is locked in the desired angular position inside the housing 1 by means of a locking cotter pin 27. The locking cotter pin 27 further prevents the axial movement of the screw backwards from the housing 1. The adjusting screw 17 has two cylindrical support surfaces, one within the housing 1 and the other one within the support sleeve 36, which, at the same time, are sliding surfaces. The through opening for the adjusting screw 17 in the chain transmission housing 1 is sealed by means of a sealing ring 52. The sealing ring 52 is arranged and positioned in a groove which is located in the rear part of the screw 17. The adjusting screw 17 can be fixed within the housing 1 after every one-fourth of its turn by the cotter pin 27 mounted in one of the two openings in the screw 17. For this purpose, one of the two slots on the inside of the housing 1 is used. The adjusting screw 17 may be rotated using a 5 mm hex key, to do it, one has to insert the hex key into a hexagonal recess on the rear end of the screw 17, after having removed the cotter pin 27. When adjusting the tension of the chain 38, it is necessary to maintain the position of the adjusting screw 17 by keeping it from moving outwards from the housing 1. The support sleeve 36 for the adjusting screw 17 is installed in a blind opening in the front wall of the housing 1 recess for the tensioner 14. In the housing 1, this blind opening provides a seat 80 for the sleeve 36 and enables its removal. Thus, the adjusting screw 17 does not cause wear and tear in the housing 1 by its front part, since it only contacts the support sleeve 36. This increases the reliability and maintainability of the structure.

When moving backwards, the tensioner 14 places the roller 16 in contact with the drive chain 38 by adjusting its position by rotating the adjusting screw 17. When the chain 38 moves and the position of the tensioner 14 was adjusted, the roller 16 rotates around the axis of the tensioner 14 by means of the needle bearing 54. As such, when the chain 38 moves, the rotating roller 16 both rolls and slides along the outer side of the drive chain. Lubricant flows from the outer cylindrical surface of the roller 16 to its bearing. The roller 16 freely rotates about the tensioner 14 by virtue of the presence of the bearing and other structural elements.

When the tension of the drive chain 38 is adjusted, the tensioner 14 slides with its upper and lower faces within the recess along the inclined upper and lower horizontal faces in the chain transmission housing 1, and the vertical faces of the tensioner flange 14 slide along the faces of the two protrusions above and below the recess in the housing 1. As such, the tensioner 14 further slides with its horizontal rounded edges against roundings of the support 15 inside the recess along the edges of the housing cover 2 of the chain transmission. The tensioner 14 assembly has five support surfaces and sliding surfaces: two horizontally inclined planes within the housing 1, one vertical plane in the housing 1, two horizontal and inclined ones in the chain transmission housing 2 cover, as well as one additional support on the thread of the adjusting screw 17.

That is, the tensioner support 15, which rests against the housing cover 2, a second support point for the tensioner appears in the transmission. This also increases the service life and reliability of the chain tensioning system structure and the transmission as a whole.

The rear chain guide 18, aside from defining the movement trajectory of the chain 38 within a defined area and reducing the amplitude of chain oscillations, enables the defining of minimum pre-tension of the rear portion of the chain. The front chain guide 20, aside from defining the movement trajectory of the chain with reduced tension and reducing the amplitude of its oscillations, enables the maintaining of the necessary engagement of the chain 38 with the reverse gear sprocket 43 while reducing the chain tension. The guides 18 and 20 for the drive chain 38 function both when forward gear and when reverse gear is selected. By using the guides 18 and 20 of the chain 38, stability of the engagement between the chain and the sprockets 41, 42, 43 is increased, and thus reliability is enhanced. With the cotter pin 27 installed, the positions of the adjusting screw 17 and the tensioner 14 are fixed. As such, the roller 16 is able to rotate.

A blind marking starting opening 77 is provided in the housing 1 for drilling and threading a M14X1.5 thread for mounting a repair support screw 78 with a blind support opening and a sealing ring 79 instead of the support sleeve 36 for the adjusting screw 17. This is provided for the case where the support sleeve 36 of the adjusting screw 17 and the seat for the latter in the housing 1 are worn out. This increases the maintainability of the housing 1.

When the gearshift lever 7 is moved from the front position in (FIG. 2) to the rear position until it stops (in FIG. 1), the effect is transmitted from the lever 7 to the outer switching fork 61 by means of drive rods and levers of the gearshift lever 7 mechanism, part of which are fixed to the support bracket 8 and have a specific kinematic scheme for transmission of the effect. The outer switching fork 61 rotates within the sector 59. Use of the sector 59 as a removable part increases the service life and maintainability of the structure. The outer fork 61 is fixed in the second extreme position after passing the intermediate apex of its trajectory, which allows a short reverse movement of the inner fork 68 to fix it and restrict the compression motion of the pullback spring 74, which is located in the recess of the movable gear 39. When the fork 61 turns, the standard adjusting rod 63 attached to it moves, wherein the lever connected to it rotates with the axle 64. By turning the lever with the axle 64, the inner switching fork 68 also turns due to its fixation on the axle 64 by means of spring pins 70.

The increased wall thickness of the outer 61 and inner forks 68, ranging from 4.9 to 5.1 mm for the inner fork and from 7.85 to 8 mm for the outer fork and the use of cylindrical hardened one-piece pins 69 leads to an increase in service life, connection reliability and maintainability of the transmission unit.

The fork 68 moves the movable reverse gear 39 to the right along the spline coupling on the spline coupler 47 by means of two cylindrical hardened one-piece pins 69. At this time, the spike-groove elements of the movable gear 39 and the drive sprocket 42 disengage. The drive sprocket 42 continues to rotate freely about the spline coupler 47 by means of a needle bearing and be engaged with the chain 38, and the movable gear 39 enters into a gear engagement with the reverse gear 40. The gear 40 is engaged with the reverse gear sprocket 43 by means of the spike-groove elements. The reverse gear sprocket 43 is in continuous engagement with the drive chain 38. The torque from the input shaft 3 is transmitted to the spline coupler 47, then to the movable gear 39, then to the reverse gear 40, then to the reverse gear sprocket 43, then to the drive chain 38, then to the driven sprocket 41 and, by means of the spline coupling, to the output shaft 4, then to the left 6 and right 5 track drive sprockets by means of a mounting seat which has a profiled outline. When the gearshift lever 7 is again moved forward until it stops upon the sector 59 by means of the outer fork 61, the operations take place in a reverse sequence, and the front gear is switched on.

LIST OF REFERENCE SIGNS

Figure 5:
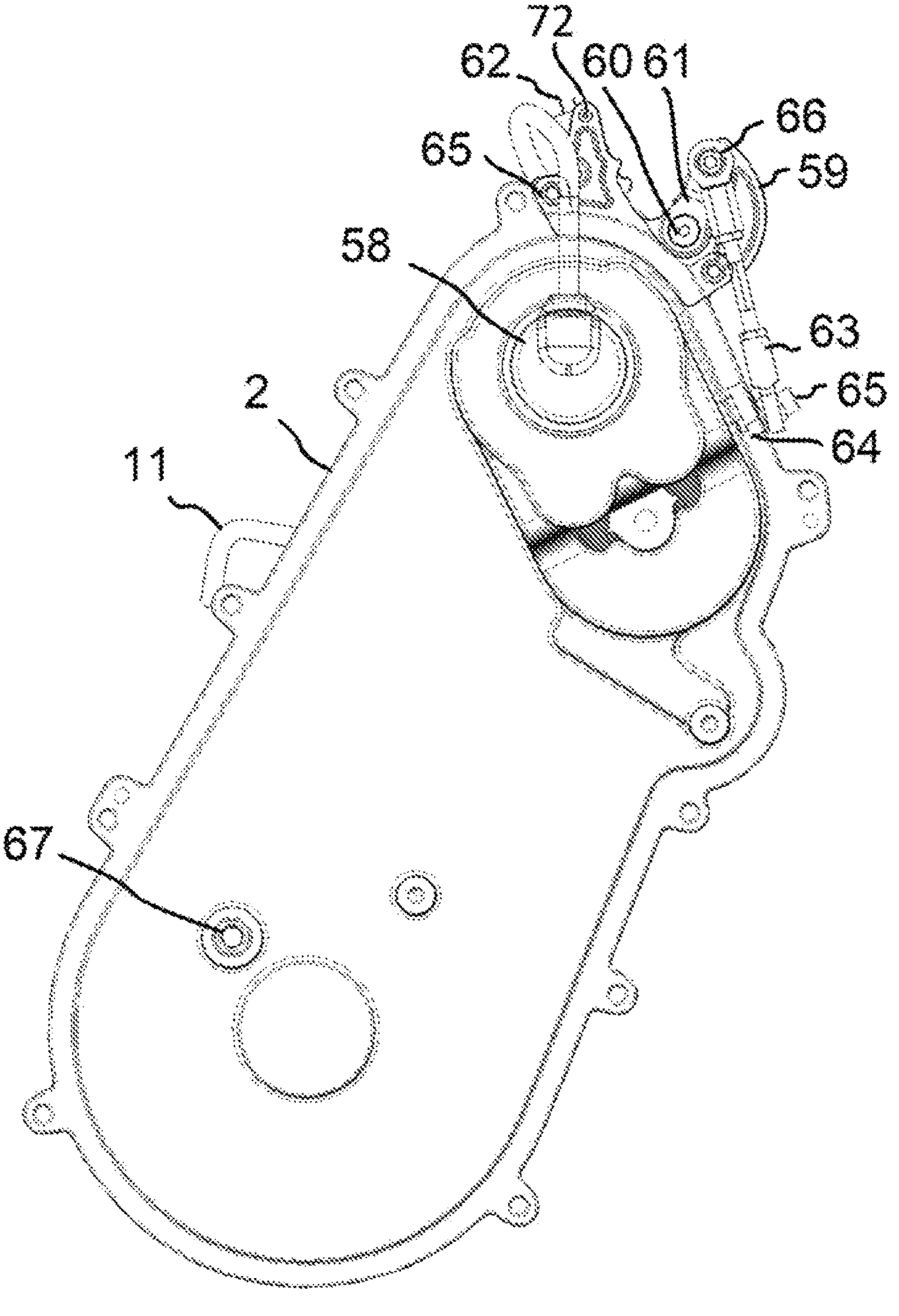
FIG. 5 Right-side view of the assembled housing cover.
Figure 6:
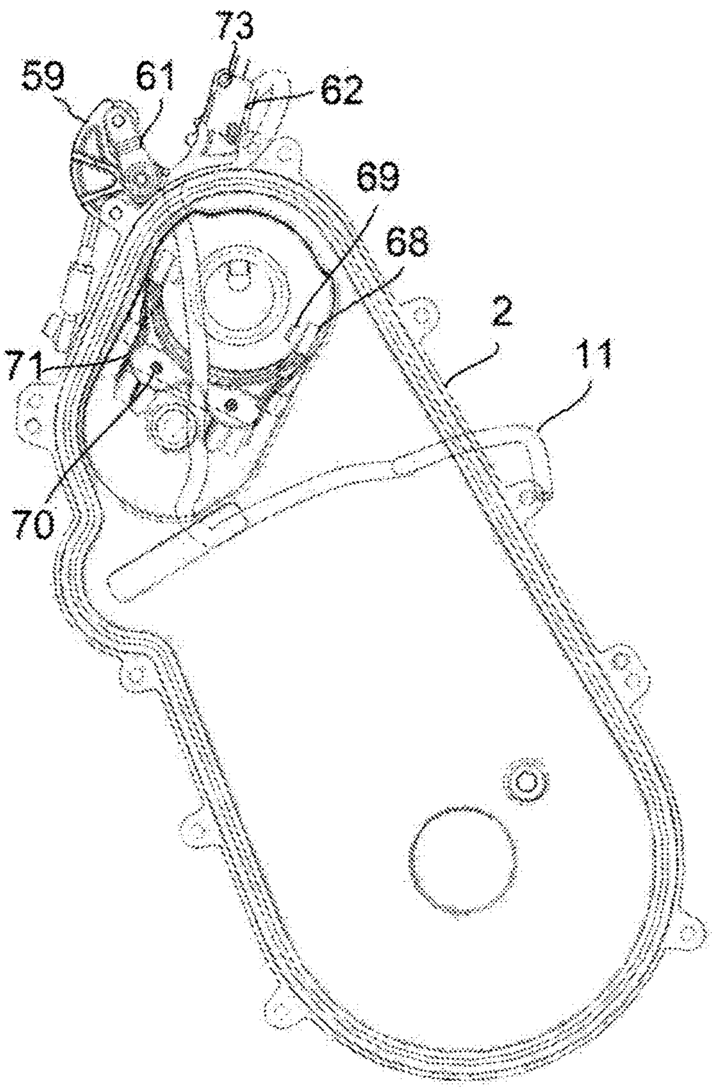
FIG. 6 Left-side view of the assembled housing cover.
Figure 7:
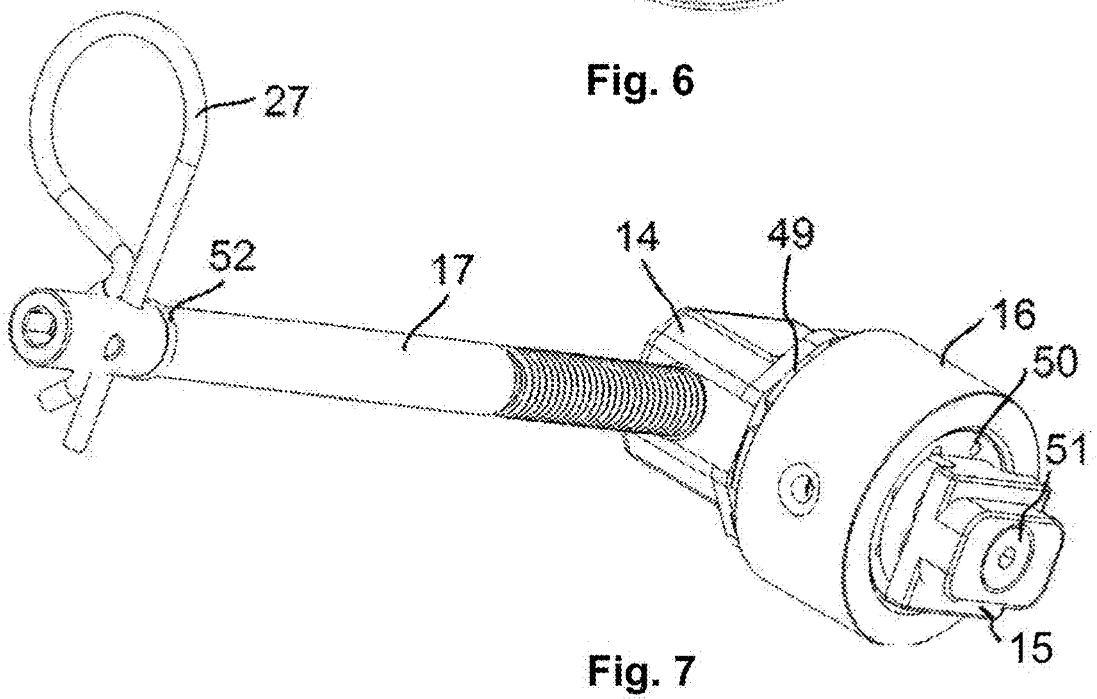
FIG. 7 Assembled chain tensioning system.
Figure 8:
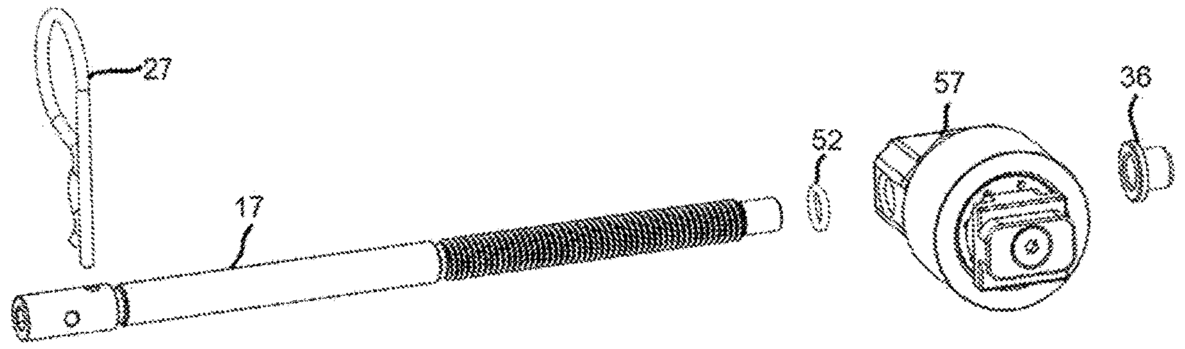
FIG. 8 Exploded view of the chain tensioning system.
Figure 9:
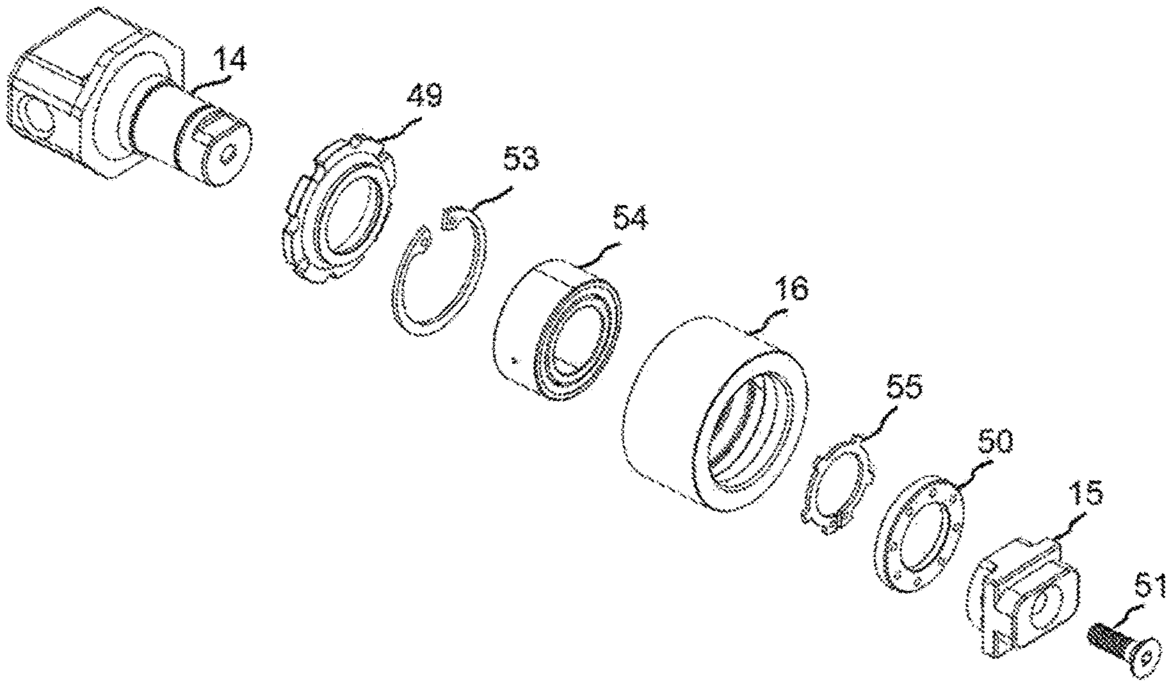
FIG. 9 Exploded view of the chain tensioner.
Figure 10:
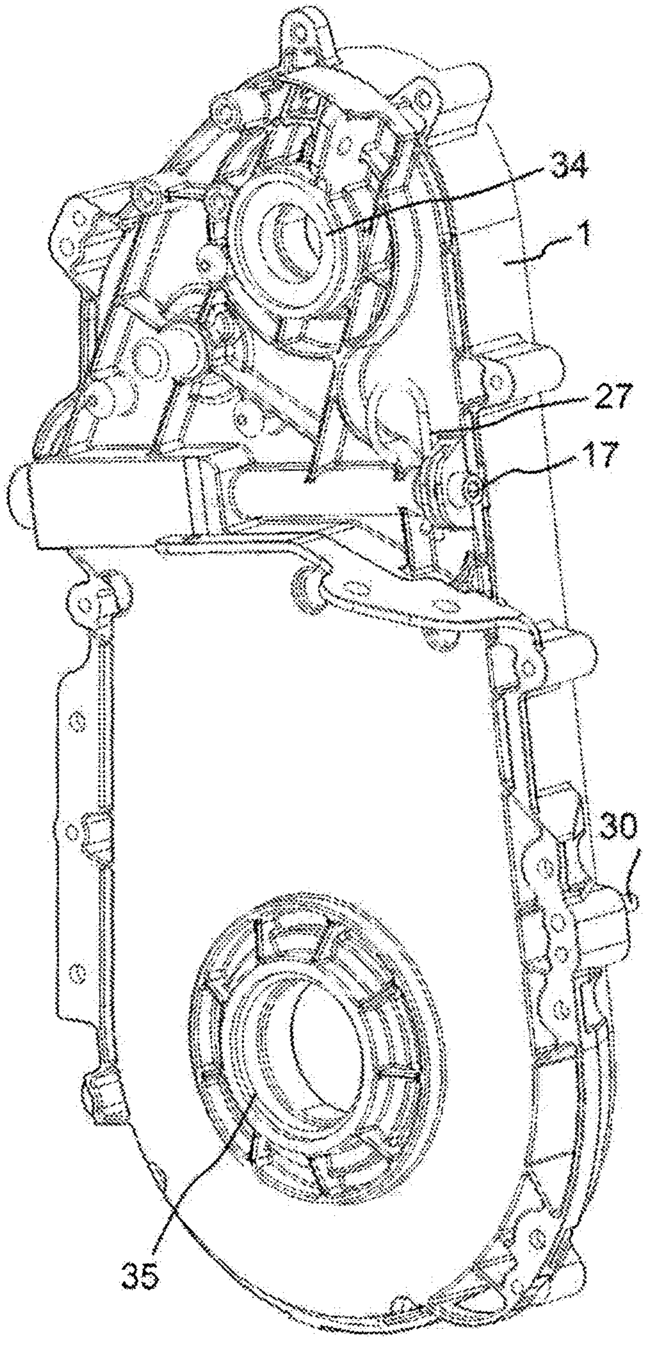
FIG. 10 Left-side oblique view of the assembled chain transmission housing.
Figure 11:
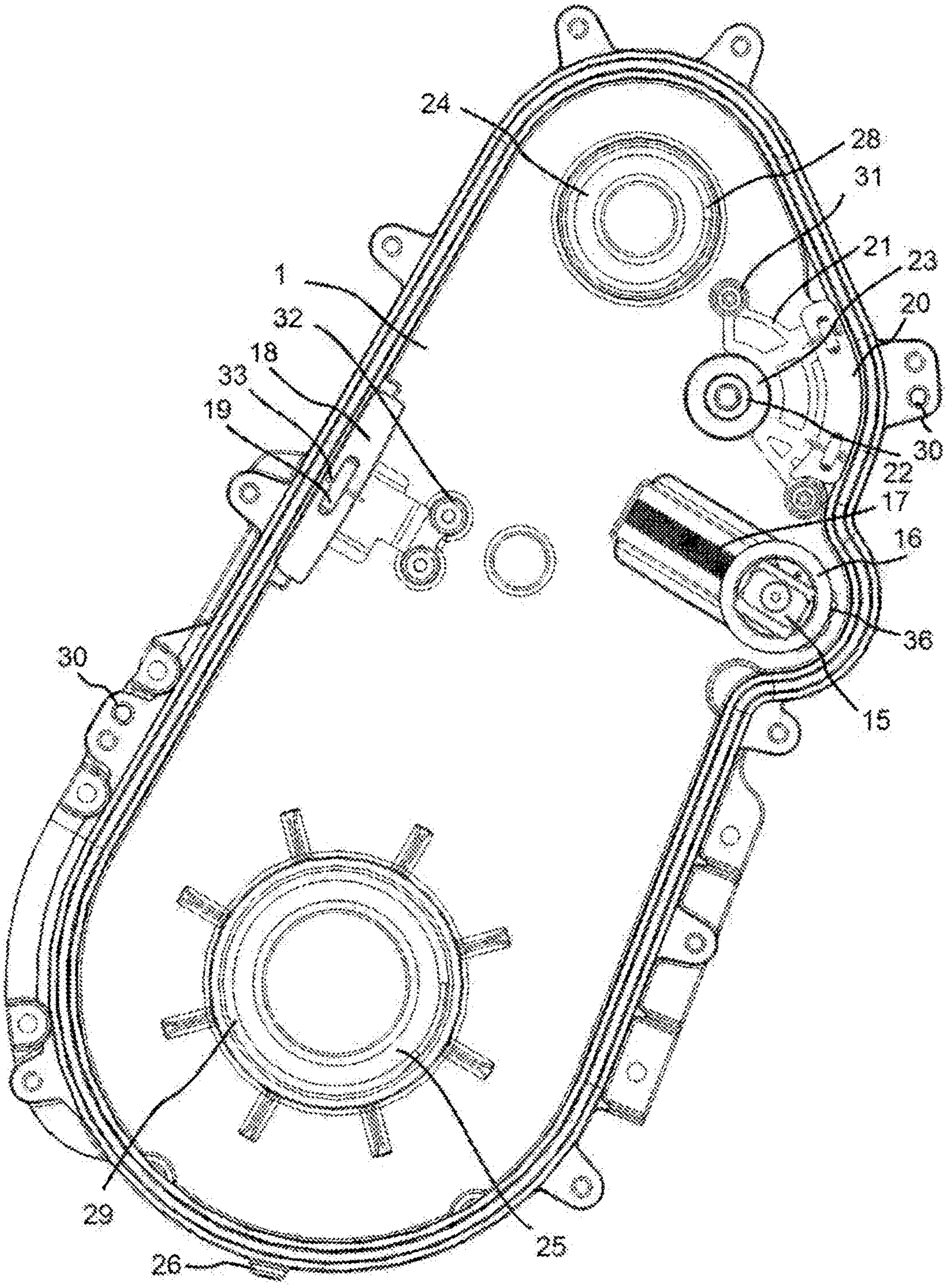
FIG. 11 Right-side view of the assembled chain transmission housing.
Figure 12:
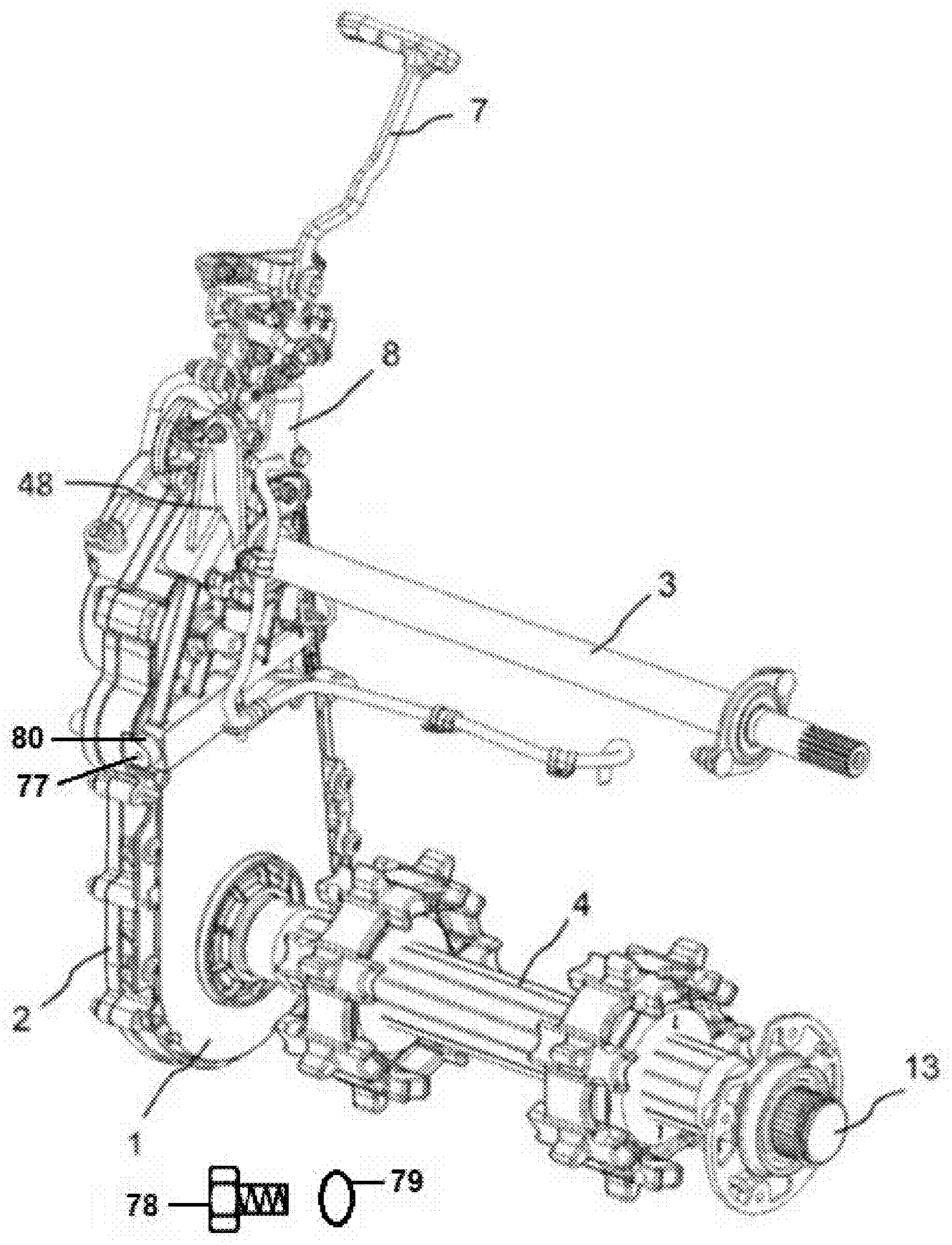
FIG. 12 Front oblique view of the assembled transmission.

1. Chain transmission housing;
2. Chain transmission housing cover;
3. Input shaft;
4. Output shaft;
5. Right track drive sprocket;
6. Left track drive sprocket;
7. Gear shift lever;
8. Gearshift lever mechanism support bracket;
9. Support part of the brake caliper bracket;
10. Base plate of the input shaft bearing;
11. Transmission ventilation hose;
12. Fixing bracket;
13. Plug (FIG. 12);
14. Chain tensioner;
15. Tensioner support;
16. Tensioner roller;
17. Tensioner adjusting screw;
18. Rear chain guide;
19. Rear guide bracket;
20. Front chain guide;
21. Front guide bracket;
22. Reverse axle;
23. Thrust sleeve on the axle (FIG. 11);
24. Input shaft bearing (FIG. 11);
25. Output shaft bearing (FIG. 11);
26. Drain screw;
27. Locking cotter pin;
28. Input shaft bearing locking ring (FIG. 11);
29. Output shaft bearing locking ring (FIG. 11);
30. Pin;
31. Cylinder head screw;
32. Spherical head screw;
33. Cotter pin;
34. Input shaft lip sealing (FIG. 10);
35. Output shaft lip sealing (FIG. 10);
36. Adjusting screw support sleeve;
37. Sealing between the chain transmission housing and the cover;
38. Chain;
39. Movable reverse gear;
40. Reverse gear wheel;
41. Driven sprocket of the chain transmission;
42. Drive sprocket of the chain transmission;
43. Reverse gear sprocket;
44. Drain screw sealing washer;
45. Output shaft plug;
46. Locking ring of the output shaft sprocket;
47. Spline coupler;
48. Mounting bracket to the snowmobile frame;
49. Sliding support washer;
50. Thrust washer;
51. Countersunk screw;
52. Sealing ring;
53. Bearing locking ring (FIG. 9);
54. Roller bearing (FIG. 9);
55. Locking ring;
56. Spline coupling mounting bolt;
57. Tensioner assembly;
58. Filler cap;
59. Switching sector;
60. Axial screw;
61. Outer switching fork;
62. Reverse limit switch;
63. Standard adjusting rod;
64. Lever with axle;
65. Screw;
66. Screw;
67. Check plug;
68. Inner switching fork;
69. Cylindrical hardened one-piece pin;
70. Spring pin;
71. Copper spacer ring;

72. Screw (FIG. 5);
73. Nut (FIG. 6);
74. Pullback spring;
75. Locking ring;
76. Spacer washer;
77. Blind marking
78. Support screw;
79. Sealing ring; and
80. Seat.

The invention claimed is:

1. A snowmobile transmission comprising:

a chain transmission housing with a cover;

an input shaft and output shaft arranged inside the housing;

a chain transmission drive arranged inside the housing, the chain transmission drive including:

a chain connecting a drive sprocket arranged on the input shaft to a driven sprocket arranged on the output shaft;

an inner switching fork connected to an axle with a lever;

a reverse gear axle about which a reverse gear sprocket freely rotates, the reverse gear sprocket engaging with the chain; and a reverse gear configured to engage with a movable gear arranged on a spline coupler of the input shaft, the movable gear being movable by tilting of the inner switching fork and capable of being driven by the axle with the lever;

an outer switching fork arranged outside the housing, the outer switching fork connected by an adjusting rod to the axle with the lever;

a removable switching sector fixed to the cover of the housing, the removable switching sector including a cutout within which the outer switching fork is arranged and restricted to rotation between a first position for a forward gear mode and a second position for a reverse gear mode, wherein movement of the outer switching fork to the second position causes the adjusting rod to tilt the axle with the lever that drive the inner switching fork which in turn moves the movable gear into gear engagement with the reverse gear, the reverse gear then engaging the reverse gear sprocket that is engaging the chain; and an adjusting screw extending in a recess of the housing, the adjusting screw abutting against a removable support sleeve that engages the housing at a first end and is capable of being fixedly secured to the housing at a second end by a cotter pin, the adjusting screw rotationally engaging a tensioner assembly that is configured to provide rolling tension to the chain.

2. The snowmobile transmission of claim 1, wherein tensioner assembly comprises a tensioner support arranged on a chain tensioner, wherein the tensioner support abuts against the cover of the housing.

3. The snowmobile transmission of claim 2, wherein tensioner assembly comprises a steel roller arranged on the chain tensioner, the steel roller providing the rolling tension to the chain.

4. The snowmobile transmission of claim 1, comprising chain guides arranged inside the housing, the chain guides configured to guide the chain both in the forward gear mode and the reverse gear mode.

5. The snowmobile transmission of claim 1, wherein the housing comprises a seat configured to receive the removable support sleeve for the adjusting screw to abut against removable support sleeve at the first end.

6. The snowmobile transmission of claim 1, wherein the chain transmission housing comprises a marking opening, the marking opening being intended for installing a repair support screw with a sealing ring.

* * * * *